No. 692,177. Patented Jan. 28, 1902.
F. BURGER.
COMPENSATING GEAR WHEEL FOR MOTOR CARS.
(Application filed July 6, 1899.)
(No Model.)

Witnesses
Inventor
Franz Burger
Attorneys

UNITED STATES PATENT OFFICE.

FRANZ BURGER, OF FORT WAYNE, INDIANA, ASSIGNOR OF THREE-FOURTHS TO HENRY M. WILLIAMS, OF FORT WAYNE, INDIANA.

COMPENSATING GEAR-WHEEL FOR MOTOR-CARS.

SPECIFICATION forming part of Letters Patent No. 692,177, dated January 28, 1902.

Application filed July 6, 1899. Serial No. 722,947. (No model.)

*To all whom it may concern:*

Be it known that I, FRANZ BURGER, a citizen of the United States, residing at Fort Wayne, in the county of Allen and State of Indiana, have invented certain new and useful Improvements in Compensating Gear-Wheels for Motor-Cars, of which the following is a specification.

This invention relates to compensating gear-wheels adapted more especially for use in connection with electric-motor cars; and it has for its object to improve the construction of such wheels in order to prevent rumbling and compensate for wear; and to these ends the invention consists in a gear-wheel embodying the features of construction and arrangement of parts substantially as hereinafter more particularly set forth.

Figure 1:
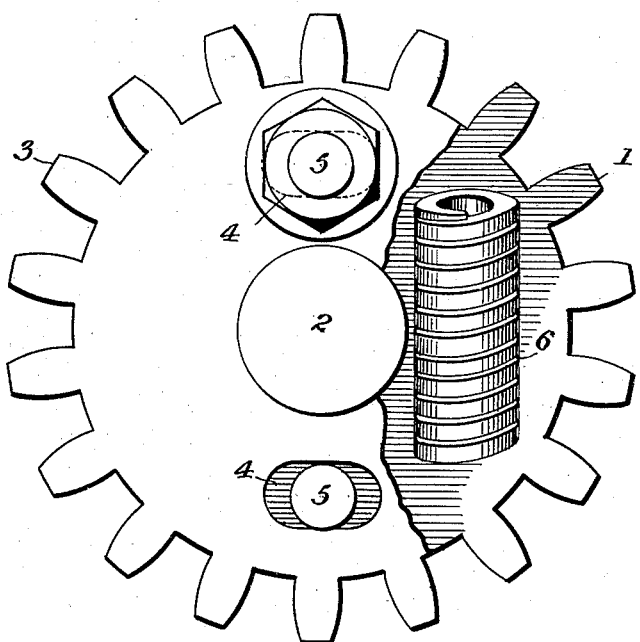
Figure 2:
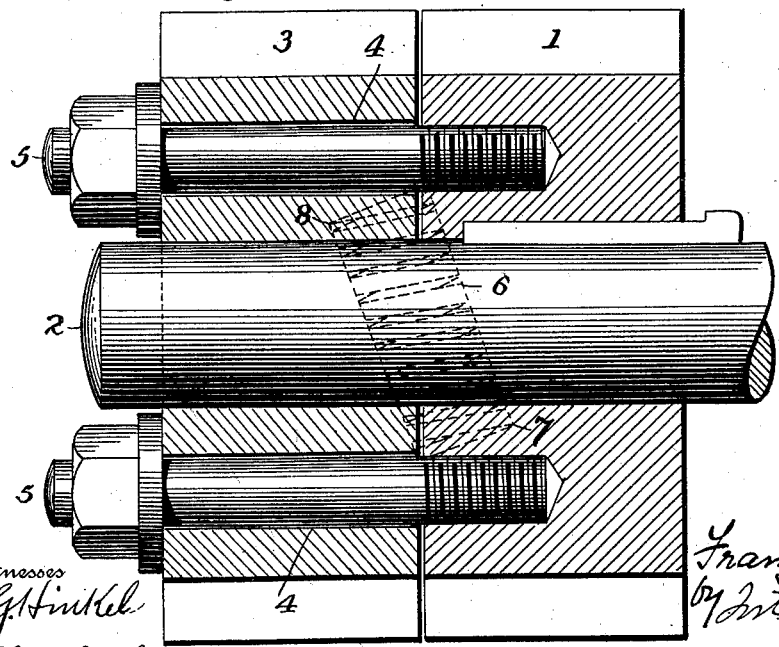

Referring to the accompanying drawings, Figure 1 is a side view of two wheels, one in advance of the other, the front one being partially broken away to show the other wheel, with one of the compensating springs. Fig. 2 is a longitudinal vertical section of the two wheels mounted on the shaft, showing a compensating spring in dotted lines.

In designing gear-wheels and in order to obtain smooth running it is customary to make the space between the teeth a certain proportion larger than the tooth itself. This space increases as the teeth wear, and the result is that the backlash increases and the wheels run with more or less play between the teeth, causing a rattling or rumbling sound, which is obnoxious, and many attempts have been made to overcome these objections.

In carrying out my invention I provide what I term a "compensating gear-wheel," which is practically made up of two gears of equal pitch and diameter, arranged side by side and connected in any suitable manner, as hereinafter described, so that the objections above stated are avoided, and the teeth of the engaging gears will mesh properly with the compensating gear-wheel, so as to have a relatively tight fit and avoid excessive wear.

While my invention is designed more particularly for use in connection with electric-motor cars, where the noise is notoriously objectionable, it of course can be applied in many and various situations wherever its use is indicated, the principles of the invention being modified to suit the requirements of any particular case.

Referring to the drawings, 1 represents a gear which forms a part of the compensating gear-wheel and which is provided with teeth in the usual way and is adapted to be secured to a suitable shaft 2 by any proper means, as a key, so that it will rotate with the shaft. Arranged adjacent to this gear is another gear 3, of similar shape and having similar teeth, but which is loosely mounted on the shaft 2. The two gears are connected together so that there is a certain amount of axial movement between them, which movement may be about the width of the space between the teeth, and while they may be connected by various means I have shown the gear 3 as provided with a slot 4, through which a bolt 5 passes loosely and is screwed into the gear 1. The bolt is threaded at its outer end and provided with a nut and washer to engage the side of gear 3. There may be one or more of these bolts, there being two shown in the drawings, and it will be seen that the bolts prevent longitudinal movement of the gear 3 on the shaft relatively to gear 1, but permit a certain amount of rotary movement thereon. The two gears composing the compensating wheel are further connected by means of one or more springs, and in the present instance these are shown in the form of coiled springs 6, and the adjacent faces of each of the gears 1 3 are recessed diagonally, as at 7 8, such recesses being in alinement and forming a pocket for the reception of the spring 6. When the teeth of the two gears 1 and 3 are in alinement, the spring or springs 6 are under compression in their recesses and tend to throw the teeth of the two gears out of alinement, and so when a gear wheel or pinion engages the compensating gear the teeth of this gear fit in the corresponding recesses of the two gears 1 3, it being preferable that the teeth of the engaging gear be as wide as the combined width of the two gears 1 3, although this is not necessary, as a narrower gear can be arranged to engage the teeth of both of the gears 1 3. With this arrangement it will be evident that the teeth of the gear 1, for instance, will make contact with the side or flank of the teeth of the engaging gear, while the teeth of the gear 3 will make contact on the opposite flank of the same tooth of said gear-wheel 9, one being held against the same by the compensating spring, depending, of course, upon whether the compensating gear is the driving or the driven member. In other words, it will be seen that the teeth of gear 1, for instance, (which is fixed to the shaft 2,) will bear upon one side or flank of the teeth of the engaging gear, while the teeth of the gear 3 (which is loose on the shaft and under stress of the compensating spring) will bear on the opposite side or flank of the tooth of the engaging gear, so that the teeth of the engaging gear will fit tightly and yet without undue wear, and the spring will tend to compensate for any backlash due to wear or loose fit of the teeth, and the gears will run practically noiselessly, and the objections heretofore pointed out will be overcome.

It will thus be seen that my compensating gear-wheel is composed of two like gears placed side by side, which are loosely connected together to permit of rotary movement with relation to each other, but not longitudinal movement, and are provided with compensating springs tending to hold the teeth of the two gears out of alinement, and the two gears may be said to be elastically held in proper relations to each other.

What I claim is—

1. A compensating gear-wheel comprising two gears of equal diameter, means for holding them together to permit a partial rotary but not longitudinal movement with relation to each other, the gears being provided with alining diagonal recesses in their adjacent faces, and a spring mounted in said recesses tending to control the relations of the gears, substantially as described.

2. A compensating gear-wheel comprising two gears of equal diameter arranged side by side one of them being provided with an elongated slot, the other being provided with an opening, a bolt secured in the opening and extending through the slot, the adjacent faces of the gears being recessed, and a spring seated in said recesses, substantially as described.

3. The combination with a shaft, of a compensating gear-wheel comprising two gears of equal diameter arranged side by side on a shaft one of which is fixed to the shaft and the other is loose thereon, means for connecting the gears together to permit a partial rotary but not longitudinal movement with relation to each other, and a spring seated in a diagonally-disposed pocket formed in the adjacent faces of the gears for elastically controlling the relative relations of the two gears, substantially as described.

In testimony whereof I have signed my name to this specification in the presence of two subscribing witnesses.

FRANZ BURGER.

Witnesses:
GEO. K. TORRENCE,
J. W. HAYDEN.